United States Patent [19]

Gelman

[11] Patent Number: 4,738,165
[45] Date of Patent: Apr. 19, 1988

[54] SAW CHAIN FILE GUIDE

[75] Inventor: Mark Gelman, Columbia, S.C.

[73] Assignee: Textron Inc., Providence, R.I.

[21] Appl. No.: 77,127

[22] Filed: Jul. 24, 1987

[51] Int. Cl.$^4$ .............................................. B23D 63/10
[52] U.S. Cl. ........................................ 76/36; 76/25 A; 33/202
[58] Field of Search ........................ 76/36, 31, 25 A; 33/202

[56] References Cited

U.S. PATENT DOCUMENTS

| 2,737,830 | 3/1956 | Siverson et al. | 76/36 |
| 3,055,238 | 9/1962 | Hazzard | 76/36 |
| 3,365,805 | 1/1968 | Carlton | 76/31 |
| 4,473,958 | 10/1984 | Atkinson | 76/36 |
| 4,587,868 | 5/1986 | Kuwica | 76/36 |

Primary Examiner—Roscoe V. Parker
Attorney, Agent, or Firm—Webb, Burden, Robinson & Webb

[57] ABSTRACT

A file guide for filing a depth gauge on a saw chain cutter having a cutting tooth with a cutting tip while the cutter is connected as a part of a continuous saw chain. The file guide is adapted to rest on the saw chain incorporating a plurality of cutters and includes an elongated base member having a slot to receive a portion of a depth gauge and at least one downward projection depending from said base member to engage with the cutting tooth to cause said base member to avoid contact with the cutting tip of the cutting tooth.

18 Claims, 2 Drawing Sheets

SAW CHAIN FILE GUIDE

BACKGROUND OF THE INVENTION

1. Field of the Invention

This invention relates generally to a file guide and more particularly to a file guide for use in sharpening the cutting edge of a cutting tooth of a saw chain and for filing the corresponding depth gauge.

2. Description of the Prior Art

Saw chains of the type herein concerned have a plurality of cutters which are articulated in a well-known manner to the adjacent cutters of the saw chain. Each cutter has a body portion with a cutting tooth and a depth gauge in advance of the cutting tooth for limiting the depth of cut in a manner well known to those skilled in the art.

The cutting edge of each cutting tooth is normally sharpened by using a round file. A device for supporting a round file for sharpening cutting edges is shown in U.S. Pat. No. 2,737,830 to Silverson, et al.

A problem arises, however, when the cutting edge is sharpened since the outward projection of the cutting edge is reduced relative to the height of the depth gauge on the cutter. This reduces the cutting efficiency of the cutting edge. The efficiency can be restored by filing the depth gauge until the proper relationship between the respective heights is restored. However, the depth gauge must not be filed too much or the cutting edge will take too deep a cut and increase the likelihood of saw chain kickback.

A file guide for adjusting the relationship between the depth gauge and cutting edge of a cutting tooth is disclosed in U.S. Pat. No. 3,055,238 to Hazzard. Thus, the Hazzard patent discloses a combination file guide which rests on the tip of the cutting edge of the cutting tooth corresponding to the particular depth gauge to be filed and, therefore, the cutting edge tip is dulled which results in a loss of cutting efficiency. Furthermore, the Hazzard file guide is not angled to correspond to the incoming angle of the depth gauge which further decreases cutting efficiency.

U.S. Pat. No. 4,587,868 to Kuwica discloses a file guide for filing depth gauges which is angled to correspond with the incoming angle of the depth gauge. However, the file guide rests on the corresponding cutting edge tip, the use of the file guide dulls the cutting edge tip with consequent loss of cutting efficiency. In addition, the Kuwica file guide is cumbersome to use since it requires several pieces to align the file with the depth gauge.

SUMMARY OF THE INVENTION

An object of the invention is to provide a file guide which will protect the cutting edge and cutting tip of each cutting tooth while filing the corresponding depth gauge by avoiding contact of the cutting tip with the file guide.

A further object is to provide a file guide for filing saw chain depth gauges which has a predetermined angular disposition on its supporting member to properly file the correct incoming angle on the depth gauge.

Another object of the invention is to provide a file guide for use in sharpening the cutting edges of saw chain cutting teeth having a predetermined angular disposition on its supporting member to effect sharpening the cutting edges to the correct cutting angle.

The file guide may be carried in the operator's pocket when not in use, is relatively inexpensive, is simple in construction, and is easy to use.

The file guide permits filing the height of both the depth gauge and the cutting edge of a saw chain cutter and is adapted to rest on the saw chain incorporating the cutter. The file guide includes an elongated base member having a slot to receive a depth gauge and adjacent rakers, if any, with the upper portion of the depth gauge and rakers located above the top surface of the elongated base member. Thus, the portions of the depth gauge and adjacent rakers to be removed are exposed. The improvement includes at least one downward projection depending from the base member to engage with the cutting tooth to cause the base member to avoid contact with the cutting tip of the cutting tooth. The downward projection is also of sufficient height to cause the base member to have a forward slope paralleling the rearward edge of the depth gauge being filed.

The file guide has a second downward projection. The first projection is adapted to be located forwardly of the cutting tip on the gullet adjacent to the cutting tooth and the second projection is adapted to be located rearwardly of the cutting tip on the top plate of the cutting tooth. The first projection extends angularly toward the rear end of the base member while the second projection has an arcuate shape. The two downward projections are separated by an opening adapted to receive the cutting tip of the cutting tooth.

Also, the file guide can accommodate a triple raker depth gauge arrangement and has means for use in sharpening cutting teeth.

DESCRIPTION OF THE PREFERRED EMBODIMENT

Figure 1:
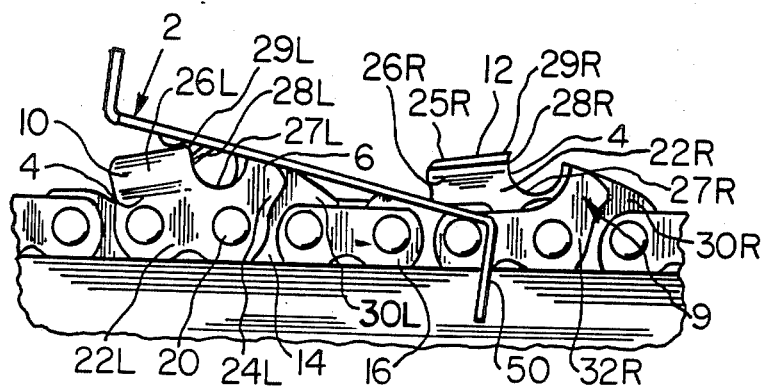
FIG. 1 is an elevation illustrating the file guide in position for filing the depth gauge of a saw chain cutter.
Figure 2:
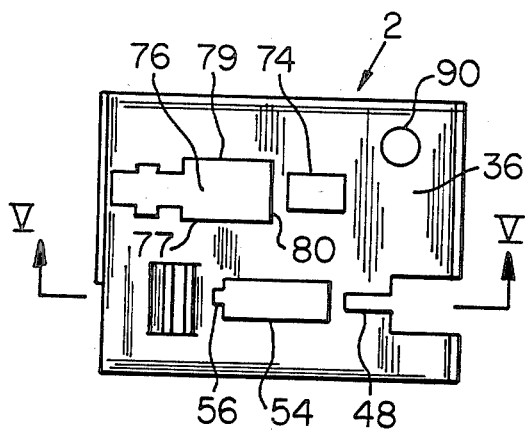
FIG. 2 is a top view of the file guide.

The drawings show a file guide 2 for sharpening saw chain cutting teeth 4 and for filing depth gauges 6 which correspond to the saw chain cutting teeth 4. Fig. 1 illustrates the file guide 2 in position on a low kickback type saw chain 9. The saw chain 9 includes alternating left hand cutters 10 and right hand cutters 12 positioned on opposite sides of the saw chain, drive links 14 and tie straps 16. Left hand cutter 10 and right hand cutter 12 are each fastened to a centrally positioned drive link 14 by rivets 20. Tie straps 16 are positioned between left hand cutters 10 and right hand cutters 12 and are fastened at each end by rivets 20 to drive links 14. Extending downwardly from each drive link 14 is a standard sprocket engaging projection (not shown) by which the saw chain 9 is driven.

Each left hand cutter 10 has a main body portion 22L, a depth gauge or raker 24L on the leading or front end of the main body portion and a working portion 26L on the trailing or rear end of the main body portion. Working portion 26L includes an L-shaped top plate 25L that terminates in a partially hook formed cutting edge 28L. Cutting edge 28L is located on the forward edge of the top plate 25L and terminates forwardly and outwardly in a cutting tip 29L. Depth gauge 24L and working portion 26L are separated by an upwardly opening arcuate notch or gullet 27L. Likewise, each right hand cutter 12 has a main body portion 22R, a depth gauge or raker 24R on the leading end of the main body portion and a working portion 26R on the trailing end of the main body portion. Working portion 26R includes an L-shaped top plate 25R that terminates in a partially hook formed cutting edge 28R. Depth gauge 24R and working portion 26R are separated by an upwardly opening arcuate notch or gullet 27R.

The depth gauges 24L are 24R are shorter than the corresponding cutting tips 29L and 29R. The difference between the height of depth gauges 24L and 24R and the height of corresponding cutting tips 29L and 29R is predetermined according to the desired depth of cut.

Figure 7:
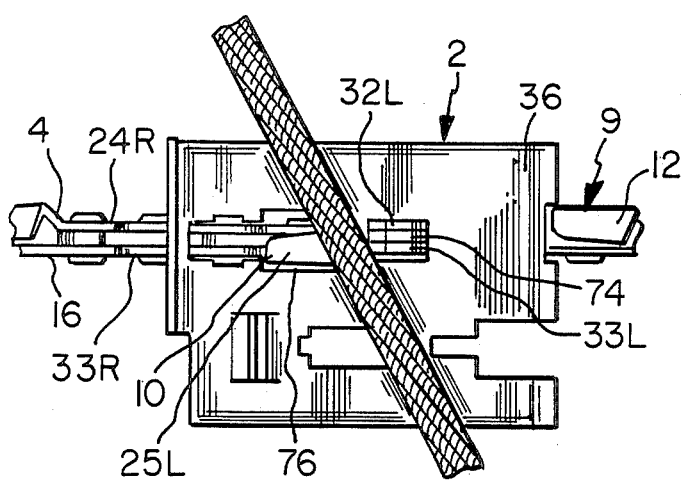
FIG. 7 is a top view illustrating the use of the file guide to sharpen the cutting edge of a cutting tooth.

As the saw chain is used, the cutting edges 28L and 28R of cutters 10 and 12 become dull and must be sharpened by using a file. As shown in FIG. 1, the top surface of working portions 26L and 26R slope downwardly toward the rear of cutters 10 and 12. As the cutting edges 28L and 28R are sharpened their height is lowered in relation to a horizontal plain through the saw chain 9. In order to maintain the desired height relationship between the depth gauges 24L and 24R and the cutting tips 29L and 29R from the horizontal plane through the saw chain 9 after the cutting teeth are sharpened, the corresponding depth gauges 24L and 24R must be filed to remove the same relative amount of material from their upper surfaces. The particular saw chain 9 shown in FIGS. 1 and 7 is a reduced kickback saw chain and utilizes a triple raker assembly corresponding to cutters 10 and 12. Left triple raker assembly 33L includes depth gauge 24L, a drive link raker 30L located on drive link 14 adjacent to one side of depth gauge 24L, and a tie strap raker 32L located on tie strap 16 adjacent to the opposite side of drive link raker 30L. Likewise, right triple raker assembly 33R includes depth gauge 24R, a drive link raker 30R located on drive link 14 adjacent to one side of depth gauge 24R, and a tie strap raker 32R located on the tie strap 16 adjacent to the opposite side of drive link raker 30R. Drive link rakers 30L and 30R extend outwardly from selected drive links 14 and tie strap rakers 32L and 32R extend outwardly from selected tie straps 16. The heights of drive link rakers 30L and 30R and tie strap rakers 32L and 32R from the horizontal plane through saw chain 9 is approximately equal to the height of depth gauges 24L and 24R from the horizontal plane of saw chain 9. The top surface of depth gauge 24L, drive link rker 30L and tie strap raker 32L slope forwardly. Corresponding rear portions of depth gauge 24L, drive link raker 30L and tie strap raker 32L have the same height and slope from the horizontal plane through the saw chain 9. Likewise, the top surfaces of depth gauge 24R, drive link raker 30R and tie strap raker 32R slope forwardly and corresponding rear portions of depth gauge 24R, drive link raker 30R and tie strap raker 32R have the same height and slope from the horizontal plane through the saw chain 9.

Figure 3:
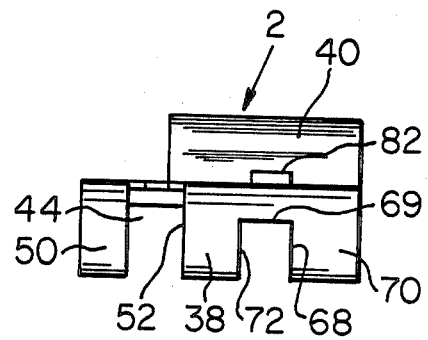
FIG. 3 is a plan view of the file guide.
Figure 4:
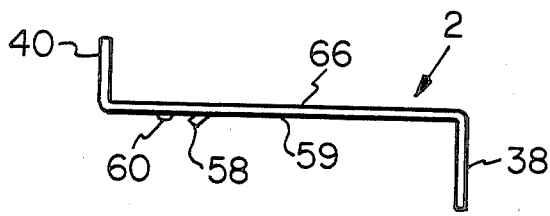
FIG. 4 is an elevation of the forward end of the file guide.
Figure 5:
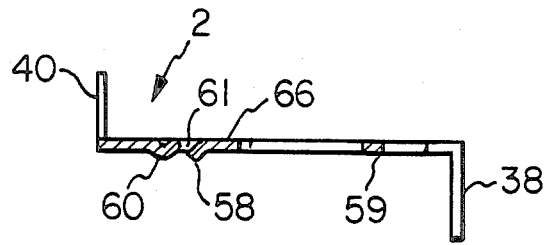
FIG. 5 is a section on line V—V on FIG. 2.
Figure 6:
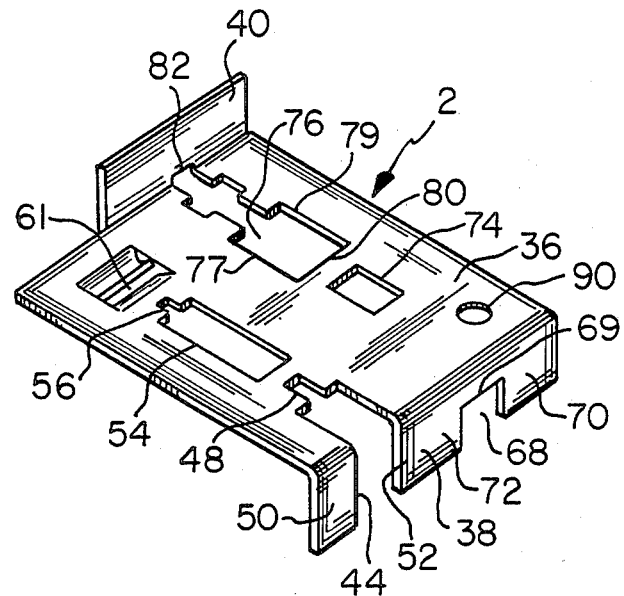
FIG. 6 is a perspective view of the file guide.

As shown in the drawings the file guide 2 of the present invention is comprised of an elongated, substantially flat base member 36 having a downwardly extending front wall 38 at one end of the base member 36 and an upwardly extending rear wall 40 at the other end of the base member 36. As shown in FIGS. 3 and 6 of the drawings, an open faced rectangular notch 44 extends from front wall 38 to flat base member 36 on the left side of file guide 2. The width of notch 44 is slightly larger than the width of saw chain 9. An open ended rectangular notch 48 having a width slightly larger than drive link 14 is centrally located at the base of notch 44. Notch 44 and notch 48 define two spaced legs 50 and 52 of end wall 38 which are adapted to straddle saw chain 9.

An adjustment slot 54 is positioned directly behind notch 48 in the base member 36. The adjustment slot 54 is substantially rectangular in shape and has a width slightly larger than the width of saw chain 9. Slot 54 includes a notch 56 which opens from the end of adjustment slot 54 closer to upwardly extending rear wall 40. Slot 54 is adapted to receive either triple raker assembly 33L or 33R. Notch 56 has a slightly larger width than the drive link rakers 30L and 30R which extend further rearwardly than corresponding tie strap rakers 32L and 32R and depth gauges 24L and 24R.

Two downward projections are located directly behind notch 56 on the lower surface 59 of base member 36. The first downward projection 58 extends downwardly toward the rear end of the guide and the second projection 60 is located behind first projection 58 and has an arcuate shape. First downward projection 58 and second downward projection 60 are separated by a rectangular opening 61.

In operation, as illustrated in FIG. 1, end legs 50 and 52 straddle chain 9 directly forward of the particular triple raker assembly 33L to be filed. Triple raker assembly 33L is received by adjustment slot 54. Also, notch 56 receives the portion of drive link raker 30L which extends further rearwardly than the corresponding depth gauge 24L and tie strap raker 32L. Projection 58 is positioned forwardly of cutting tip 29L of cutter 10 on gullet 27L. Second projection 60 is positioned rearwardly of cutting tip 29L on top plate 25L. Rectangular opening 61 receives cutting top 29L. First projection 58 prevents because of its position below cutting tip 29L in gullet 27L. As shown in projections 58 and 60 are dimensioned to maintain the lower surface 59 of base member 36 out of contact with cutting tip 29L. However, in view of the rectangular opening 61 between the projections, the opening may likewise accommodate cutting tip 29L to avoid contact between cutting tip 29L and base member 36. Also, projections 58 and 60 cause base member 36 to slope forwardly when file guide 2 is positioned in place corresponding to the slope of the rear portions of triple raker assemblies 33L and 33R. Any portion of the triple raker assembly 33L which extends through slot 54 and above the top surface 66 of base member 36 is filed down until it is flush with top surface 66. When this process is completed the triple raker assembly 33L is the proper height from the horizontal plane through the saw chain 9 and has a proper incoming angle relative to the respective cutting edge 28L.

The file guide 2 illustrated in FIGS. 1–7 may also be used for sharpening saw chain cutting teeth. FIG. 7 illustrates the file guide and a file in position to sharpen a cutting tooth. On the right side of downwardly extending front wall 38 is a downwardly opening rectangular notch 68. The upper edge 69 of notch 68 is opposite the open end of notch 68. Notch 68 has a width slightly larger than that of saw chain 9. Notch 68 defines two leg portions 70 and 72 in end wall 38 which are adapted to straddle saw chain 9 forward of the saw chain tooth to be sharpened. A rectangular slot 74 is positioned directly behind notch 68 is base member 36. Slot 74 has a width slightly larger than the saw chain and is adapted to receive triple raker assembly 33L or 33R.

A cut-out 76 is provided in base member 36 and extends to rear wall 40. Cut-out 76 includes a first edge 80, side edges 77 and 79, and rear edge 82. First edge 80 is located behind slot 74 and parallel to front downwardly extending front wall 38. Edge 80 has a length larger than the width of saw chain 9 so that either left hand cutters 10 or right hand cutters 12 can be received by cut-out 76. Side edges 77 and 79 extend rearwardly from front edge 80 to upwardly extending wall 40. Also, side edges 77 and 79 are mirror images of each other and have a plurality of sides so that cut-out 76 can receive the cutter which is to be sharpened and a portion of saw chain 9 located directly behind the cutter. Edge 82 is located in upwardly extending wall 40 and is connected to side edges 77 and 79.

In operation, as shown in FIG. 7, leg portions 70 and 72 straddle a portion of saw chain 9 behind cutter 12. The chain rests against upper edge 69 of notch 68. Rectangular slot 74 receives triple raker assembly 33L. Cut-out 76 receives cutter 10 exposing cutting edge 28L above the top surface 66 of the base member 36 is guide 2. A portion of saw chain 9 behind the cutter is also received by cut-out 76 so that wall 82 rests on saw chain 9. File guide 2 is angled by wall 82 and upper edge 69 to correspond to the top surface of the cutting edge 28L. The cutting edge is then sharpened using a file.

Typically, a circular file is used to sharpen this type of cutting edge. The file must be the correct diameter in order for the cutting edge to be properly sharpened. For this reason, a hole 90 having a diameter which corresponds to the proper circular file diameter for sharpening the blade is provided in the base member 36 of the guide so that an operator may check to see that he is using the proper size file.

It should be noted that each cutting edge and corresponding depth gauge is filed independently of adjacent cutting edges and depth gauges. Also, guides of different sizes and configurations are required for saw chains having cutting teeth with different pitches.

Having described the presently preferred embodiment of the invention, it is to be understood that it may otherwise be embodied within the scope of the appended claims.

I claim:

1. An improved file guide for filing depth gauges on saw chain cutters having cutting teeth with cutting edges and tips, gullets, and top plates, said file guide is adapted to rest on a saw chain incorporating the cutters and includes an elongated base member having an upper surface and a lower surface and a slot to receive a depth gauge and permit the top portion of said depth gauge to extend above the upper surface of said elongated base member to expose the amount of the depth gauge which is to be removed, the improvement comprising at least one downward projection depending from said base member to engage with the cutting tooth to cause said base member to avoid contact with the cutting tip of the cutting tooth.

2. The file guide as set forth in claim 1 wherein said downward projection is of sufficient height to cause said top portion of said base member to have a forward slope paralleling the rearward edge of the depth gauge when said file guide is positioned on the cutter.

3. The file guide as set forth in claim 1 wherein said file guide has two downward projections from the lower surface of said base member, a first projection adapted to be located forwardly of the cutting tip on the gullet adjacent to the cutting tooth and a second projection adapted to be located rearwardly of the cutting tip on the top plate of the cutting tooth when said file guide is positioned on the cutter.

4. The file guide as set forth in claim 3 wherein said two downward projections are separated by an opening adapted to receive the cutting tip of the cutting tooth when said file guide is positioned on the cutter.

5. The file guide as set forth in claim 3 wherein said first projection extends angularly toward a rear portion of said elongated base member and said second projection has an arcuate shape.

6. A file guide for filing a depth gauge on a saw chain cutter which has a cutting tooth with a cutting edge having a cutting tip, a top plate, and a gullet, said file guide comprising:

A. an elongated base member having an upper surface and a lower surface;

B. means on said base member for receiving a depth gauge and exposing an upper portion of the depth gauge above said upper surface of said base member, said elongated base member having a downward projection depending from said base member to engage with the cutting tooth to cause said base member to avoid contact with the cutting tip of the cutting tooth.

7. The file guide as set forth in claim 6 wherein said projection is of sufficient length to cause said upper surface of said elongated base member to have a forward slope paralleling the rearward edge of the depth gauge when said file guide is positioned on a cutter over the depth gauge.

8. The file guide as set forth in claim 7 wherein said file guide has a second downward projection extending from said lower surface of said base member, said first projection positioned forwardly from the cutting tip on the gullet adjacent to the cutting tooth and said second projection positioned rearwardly from the cutting tip on the top plate of the cutting tooth when said file guide is positioned on a cutter over the depth gauge.

9. The file guide as set forth in claim 8 wherein said two downward projections are separated by an opening adapted to receive the cutting tip of the cutting tooth when said guide is positioned on the cutter.

10. The file guide as set forth in claim 8 wherein said first projection extends angularly toward the rear end of said elongated base member and said second projection has an arcuate shape.

11. A file guide for sharpening saw chain cutting teeth and for filing depth gauges which correspond to the cutting teeth, the saw chain having right hand and left hand cutting teeth, each cutting tooth having a transverse working portion, a cutting edge formed on said working portion with a cutting tip at an outer end and a depth gauge spaced forwardly from the cutting edge, said file guide comprising:

an elongated base member having an upper surface and a lower surface;

means on said base member for fitting said file guide over a cutting tooth to expose its cutting edge and to provide a guide for a file to sharpen the cutting edge; and means on said base member for fitting said file guide over a depth gauge to expose the top of the depth gauge for filing the depth gauge associated with the cutting tooth, at least one downward projection depending from said base member to engage with the cutting tooth to cause said base member to avoid contact with the cutting tip of the cutting tooth.

12. The file guide as set forth in claim 11 wherein said projection is of sufficient length to cause said upper surface of said base member to have a forward slope paralleling the rearward edge of the depth gauge when said file guide is positioned over the depth gauge.

13. The file guide as set forth in claim 12 including a second downward projection extending from said lower surface of said base member, said first projection positioned forwardly from the cutting tip on a gullet adjacent the cutting tooth and said second projection positioned rearwardly from the cutting tip on a top plate of the cutting tooth when said base member is positioned over the depth gauge.

14. The file guide as set forth in claim 13 wherein said two downward projections are separated by an opening adapted to receive the cutting tip of the cutting tooth when said guide is positioned on the cutter.

15. The file guide as set forth in claim 13 wherein said first projection extends angularly toward the rear end of said base member and said second projection has an arcuate shape.

16. The file guide as set forth in claim 11 wherein said means for fitting said file guide over a depth gauge for filing the depth gauge includes a slot in said base member to receive the depth gauge and said slot is dimensioned to also receive an adjacent tie strap raker and drive link raker.

17. The file guide as set forth in claim 11 wherein said means for fitting said file guide over a depth gauge for filing the depth gauge includes a slot in said base member to receive the depth gauge and said slot is dimensioned to also receive an adjacent link raker.

18. The file guide as set forth in claim 11 wherein said base member has a bore therethrough corresponding to the correct file diameter for sharpening the cutting teeth.

* * * * *